Patented Feb. 13, 1940

2,189,808

UNITED STATES PATENT OFFICE 2,189,808

β-ALKYL CHOLINE SALTS AND INTERMEDIATES AND PROCESSES FOR THEIR PRODUCTION

Randolph T. Major, Plainfield, and Howard T. Bonnett, Rahway, N. J., assignors to Merck & Co., Inc., Rahway, N. J., a corporation of New Jersey No Drawing. Original application July 6, 1935, Serial No. 30,150. Divided and this application January 23, 1937, Serial No. 121,980

7 Claims. (Cl. 260—584)

This is a division of application Serial No. 30,150, filed July 6, 1935.

This invention relates broadly to processes for preparing β-alkyl-choline iodides and salts of acids whose silver salts are more soluble than silver iodide (specificaly exemplified by processes for the production of β-methyl-choline chloride), and relating more particularly to optical isomers thereof and methods for their preparation.

Patent No. 2,040,145, issued May 12, 1936, to one of us, Randolph T. Major, in association with Joseph K. Cline, relates to the preparation of the racemic form of β-methyl choline chloride.

Theoretically, it should be possible to prepare two optically active forms of this and related choline compounds when they contain an asymmetric carbon atom. Since it is generally recognized that one of the optical isomers of a medicinal chemical is usually much more active physiologically than the other, it was considered desirable to attempt the production of the theoretically possible optical isomers.

Pharmacological tests with the optical isomers of β-methyl choline chloride show that the physiological action of the d-form is stronger than even the racemic form; whereas the laevo form is considerably milder. Thus the production and isolation of both forms, together with the known racemic form, afford to the medical profession a much wider range for accurate dosage and control with these highly potent drugs.

The results of our experiments indicate that the most satisfactory method of producing these isomers, is to prepare them from the corresponding optical isomers obtained by resolving the racemic dimethylaminoisopropanol by appropriate means, as will further appear, into its d- and l-forms, and to convert them, respectively, into their corresponding methyl choline iodides. Thereafter, we may prepare the chlorides or other salts from the iodides. Proceeding in this manner, the optical isomers of β-methyl choline chloride are obtained as white crystalline hygroscopic solids; the d-form having a melting point of 165–167° C. and an optical rotation, $$(\alpha)_D^{25} = +38.8°$$

and the l-form a melting point of 165–167° C. and a rotation, $$(\alpha)_D^{25} = -38.2°$$

The process as above described may also be applied to the production of other salts. Obviously, such other salts of acids may be thus prepared where the acid involved is one whose silver salts are more soluble than silver iodide.

The following description of the more detailed steps of the process exemplifies the general method as directed more particularly to the ultimate production of both optical isomers of β-methyl choline chloride.

Resolution of dimethylaminoisopropanol

Dimethylaminoisopropanol, is known to be racemic and its resolution into the d- and l-forms is accomplished by using the following manner:

*d-Form.*—Dimethylaminoisopropanol, having a boiling point of 124–126° C., is treated with 5% excess bromo-camphorsulfonic acid in ethyl acetate solution. The salt is recrystallized from a mixture of 5 cc. ethyl acetate and 1 cc. absolute alcohol per gram of salt, its rotation becoming constant at +83.5° The dextro-amine is obtained from the salt by treating the latter with an excess of NaOH, extracting with ether, drying the ether solution with anhydrous K₂CO₃, and distilling at atmospheric pressure. It has a boiling point of 124.5–126° C. at 770 mm.; optical rotation $$(\alpha)_D^{25} = +17.1°$$

*l-Form.*—Dimethylaminoisopropanol having a boiling point of 124–126° C., is treated with 1.05 mols of d-tartaric acid in 95% alcohol solution. The salt is recrystallized from a mixture of 6 cc. 96% alcohol per gram of salt. After repeated recrystallizations, a salt is obtained having rotation, $$(\alpha)_D^{25} = -10.7°$$

The laevo-amine is obtained from the salt by treating the same with an excess of NaOH, extracting with ether, drying the ether solution with anhydrous K₂CO₃, and distilling at atmospheric pressure. It has a boiling point of 125°, and optical rotation about $$(\alpha)_D^{25} = -15°$$

The racemic amine may also be resolved into its d- and l-forms by treating it with bromo-camphorsulfonic acid to separate out the dextro-form, removing the bromo-camphorsulfonic acid from the salt, and treating the residue of the amine thus liberated with d-tartaric acid to obtain the laevo form after further purification. The reverse of the process may also be followed by first treating the racemic amine with d-tartaric acid, and treating the residue of the amine with bromo-camphorsulfonic acid to obtain the dextro-form, all substantially in the manner described.

Preparation of d- and l-β-methylcholine iodides

The methiodides of the respective amines are prepared by treating the latter with methyl iodide in ether solution at room temperatures. They are recrystallized from hot absolute alcohol to which about 20% acetone is added after solution. The $d$-$\beta$-methylcholine iodide has a melting point of 176–177° C., and optical rotation, $$(\alpha)_D^{25} = +24.7°$$

the $l$-$\beta$-methylcholine iodide has a melting point of 176.5–177.5° C., and, $$(\alpha)_D^{25} = -24.7°$$

*Preparation of d- and l-β-methylcholine chlorides*

The $d$- and $l$-$\beta$-methylcholine chlorides are prepared by reacting upon the respective iodides with AgCl in alcohol solution. The silver salts formed in the reaction are removed by filtration. The last traces of silver chloride are removed by passing hydrogen sulfide into the solution. Charcoal is added and the mixture filtered. The filtrate is concentrated to a gummy consistency, and then the salts are recrystallized from butyl alcohol. The $d$-$\beta$-methylcholine chloride has a melting point of 165–167° C., and $$(\alpha)_D^{25} = +38.8°$$

the laevo-form, a melting point of 165–167°, and $$(\alpha)_D^{25} = -38.2°$$

*Preparation of d- and l-β-methylcholine salts*

In general, various salts of $d$- and $l$-$\beta$-methylcholine may be prepared by reacting upon the methiodides of the respective isomers with the corresponding silver salt of a acid whose silver salt is more soluble than silver iodide.

The racemic forms of all the intermediate and ultimate products are readily produced by the same steps throughout without resolving the racemic dimethylaminoisopropanol into its optical isomers, thus:

Racemic dimethylaminoisopropanol
+ Methyl iodide
β-methyl-choline iodide
+ Silver salt
β-methylcholine salt It will be apparent that various modifications may be made in any of the steps in the processes as described without departing from the spirit and scope of the invention.

We claim as our invention:

1. A process for producing optically active isomers of $\beta$-methyl choline salts which comprises the steps of resolving dimethylaminoisopropanol into its dextro- and laevo-forms by treating the racemic form of the amine with an optically active acid of the group consisting of bromocamphor sulfonic acid and d-tartaric acid, subsequently treating the optical isomers with methyl iodide to form their methiodides, and thereafter converting the methiodides into the desired salts by reacting upon them with the silver salt of a corresponding inorganic acid whose silver salt is more soluble than silver iodide.

2. The process of producing $\beta$-methyl choline salts which comprises the steps of treating dimethylaminoisopropanol with methyl iodide to form its methiodide, and thereafter converting the methiodide into the desired salt by reacting upon it with the silver salt of a corresponding inorganic acid whose silver salt is more soluble than silver iodide.

3. Optically active $\beta$-methylcholine salts of inorganic acids whose silver salts are more soluble than silver iodide.

4. $d$-$\beta$-methylcholine chloride being in the form of a white hygroscopic crystalline solid having, in its pure form, a melting point of about 165–167° C., and optical rotation about $$(\alpha)_D^{25} = +38.8°$$

5. $l$-$\beta$-methylcholine chloride, being in the form of a white hygroscopic crystalline solid having, in its pure form, a melting point of about 165–167° C. and optical rotation about $$(\alpha)_D^{25} = -38.2°$$

6. As intermediates in the production of optically active $\beta$-methylcholine salts, optically active isomers of dimethylaminoisopropanol.

7. Optically active isomers of compounds of the group consisting of dimethylaminoisopropanol, beta-methylcholine iodide, and beta-methylcholine chloride.

RANDOLPH T. MAJOR.
HOWARD T. BONNETT.